United States Patent
Eschbach et al.

(10) Patent No.: US 9,245,209 B2
(45) Date of Patent: Jan. 26, 2016

(54) DYNAMIC BLEED AREA DEFINITION FOR PRINTING OF MULTI-DIMENSIONAL SUBSTRATES

(71) Applicant: Xerox Corporation, Norwalk, CT (US)

(72) Inventors: Reiner Eschbach, Webster, NY (US); James Milo Sweet, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 253 days.

(21) Appl. No.: 13/683,249

(22) Filed: Nov. 21, 2012

(65) Prior Publication Data

US 2014/0139849 A1    May 22, 2014

(51) Int. Cl.
    *G06F 15/00*    (2006.01)
    *G06K 15/02*    (2006.01)
    *B31B 1/00*     (2006.01)
    *G06T 5/00*     (2006.01)

(52) U.S. Cl.
    CPC . *G06K 15/02* (2013.01); *B31B 1/00* (2013.01); *G06K 15/021* (2013.01); *B31B 2201/88* (2013.01); *B31B 2203/066* (2013.01)

(58) Field of Classification Search
    CPC .. G06K 15/02; G06K 15/021; B31B 2201/88; B31B 2203/066
    USPC .......... 358/1.1–1.16, 1.6, 1.9, 1.14, 1.15, 3.1, 358/3.12, 3.26, 3.27; 382/254, 255, 264, 382/275; 345/136, 137
    See application file for complete search history.

(56) References Cited

U.S. PATENT DOCUMENTS

| | | |
|---|---|---|
| 5,235,519 A | 8/1993 | Miura |
| 5,353,390 A | 10/1994 | Harrington |
| 5,457,904 A | 10/1995 | Colvin |
| 5,687,087 A | 11/1997 | Taggart |
| 5,805,784 A | 9/1998 | Crawford |
| 5,838,574 A | 11/1998 | Olson et al. |
| 5,881,538 A | 3/1999 | Blohm |
| 5,923,556 A | 7/1999 | Harris |
| 6,005,959 A | 12/1999 | Mohan et al. |

(Continued)

FOREIGN PATENT DOCUMENTS

| | | |
|---|---|---|
| EP | 621113 A1 | 10/1994 |
| WO | WO-2005122079 A2 | 12/2005 |

(Continued)

OTHER PUBLICATIONS

Lu et al., "Folding Cartons with Fixtures: A Motion Planning Approach", IEEE Transactions on Robotics and Automation, vol. 16, No. 4, Aug. 2000, pp. 346-356.

(Continued)

*Primary Examiner* — Gabriel Garcia
(74) *Attorney, Agent, or Firm* — Fox Rothschild LLP (57) ABSTRACT

A method of defining a three-dimensional structure having multiple facets, such as a package, identifies an image that is to be printed on a first facet. It also identifies a second facet of the package that has a functional relationship with the first facet, determines whether the functional relationship is that of a crease, an edge, or another functional relationship, and automatically defines a bleed area by accessing a rule set and applying the rule set to the determined functional relationship. The bleed area includes an area in which the first image will be printed and that is outside of the location of the first facet.

21 Claims, 7 Drawing Sheets

(56) References Cited

U.S. PATENT DOCUMENTS

| | | | |
|---|---|---|---|
| 6,090,027 | A | 7/2000 | Brinkman |
| 6,117,061 | A | 9/2000 | Popat et al. |
| 6,134,018 | A | 10/2000 | Dziesietnik et al. |
| 6,153,039 | A | 11/2000 | Jacobsen |
| 6,237,787 | B1 | 5/2001 | Gallo et al. |
| 6,243,172 | B1 | 6/2001 | Gauthier et al. |
| 6,246,468 | B1 | 6/2001 | Dimsdale |
| 6,332,149 | B1 | 12/2001 | Warmus et al. |
| 6,687,016 | B2 | 2/2004 | Gauthier |
| 6,689,035 | B1 | 2/2004 | Gerber |
| 6,771,387 | B2 | 8/2004 | Gauthier |
| 6,895,549 | B1 | 5/2005 | Albright et al. |
| 6,939,063 | B2 | 9/2005 | Bussell |
| 6,945,645 | B2 | 9/2005 | Baron |
| 6,953,513 | B1 | 10/2005 | Volkert |
| 7,174,720 | B2 | 2/2007 | Kennedy |
| 7,293,652 | B2 | 11/2007 | Learn et al. |
| 7,327,362 | B2 | 2/2008 | Grau |
| 7,366,643 | B2 | 4/2008 | Verdura et al. |
| 7,647,752 | B2 | 1/2010 | Magnell |
| 7,832,560 | B2 | 11/2010 | Tilton |
| 1,005,288 | A1 | 3/2011 | Eschbach et al. |
| 7,941,465 | B2 | 5/2011 | Gombert et al. |
| 1,014,933 | A1 | 6/2011 | Goetz et al. |
| 8,160,992 | B2 | 4/2012 | Gombert et al. |
| 8,170,706 | B2 | 5/2012 | Gombert et al. |
| 8,170,709 | B2 | 5/2012 | Puissant |
| 2002/0091592 | A1 | 7/2002 | Sugiura et al. |
| 2002/0104293 | A1 | 8/2002 | Armington et al. |
| 2002/0118874 | A1 | 8/2002 | Chung et al. |
| 2002/0122067 | A1 | 9/2002 | Geigel et al. |
| 2003/0035138 | A1 | 2/2003 | Schilling |
| 2003/0083763 | A1 | 5/2003 | Kiyohara et al. |
| 2003/0091227 | A1 | 5/2003 | Chang et al. |
| 2003/0164875 | A1 | 9/2003 | Myers |
| 2005/0050052 | A1 | 3/2005 | Zimmerman et al. |
| 2005/0055635 | A1 | 3/2005 | Bargeron et al. |
| 2005/0168780 | A1 | 8/2005 | Kobashi et al. |
| 2005/0249400 | A1 | 11/2005 | Fukumoto |
| 2006/0155561 | A1 | 7/2006 | Harper |
| 2007/0041035 | A1 | 2/2007 | Sembower et al. |
| 2007/0042885 | A1 | 2/2007 | Rietjens et al. |
| 2007/0079236 | A1 | 4/2007 | Schrier et al. |
| 2007/0112460 | A1 | 5/2007 | Kiselik |
| 2008/0020916 | A1 | 1/2008 | Magnell |
| 2008/0255945 | A1 | 10/2008 | Percival et al. |
| 2008/0256439 | A1 | 10/2008 | Boreham et al. |
| 2008/0273945 | A1 | 11/2008 | Levine et al. |
| 2009/0070213 | A1 | 3/2009 | Miller et al. |
| 2009/0278843 | A1* | 11/2009 | Evans .......................... 345/419 |
| 2009/0282782 | A1 | 11/2009 | Walker et al. |
| 2009/0287632 | A1 | 11/2009 | Gombert et al. |
| 2010/0058943 | A1 | 3/2010 | Bober |
| 2010/0060909 | A1 | 3/2010 | Conescu et al. |
| 2010/0098319 | A1 | 4/2010 | Gombert et al. |
| 2010/0110479 | A1 | 5/2010 | Gombert et al. |
| 2010/0207986 | A1* | 8/2010 | Hyman .......................... 347/15 |
| 2010/0214622 | A1 | 8/2010 | Ruegg et al. |
| 2011/0028292 | A1* | 2/2011 | Zhang et al. .................. 493/320 |
| 2011/0116133 | A1 | 5/2011 | Walker et al. |
| 2013/0033634 | A1 | 2/2013 | Sudheendra et al. |
| 2013/0120767 | A1 | 5/2013 | Mandel et al. |
| 2013/0120770 | A1 | 5/2013 | Mandel et al. |
| 2014/0038801 | A1 | 2/2014 | Morgana et al. |
| 2014/0038802 | A1 | 2/2014 | Clark et al. |
| 2014/0040319 | A1 | 2/2014 | Morgana et al. |
| 2014/0067104 | A1 | 3/2014 | Osterhout |
| 2014/0121800 | A1 | 5/2014 | Morgana et al. |
| 2014/0129018 | A1 | 5/2014 | Morgana et al. |
| 2014/0139849 | A1 | 5/2014 | Eschbach et al. |

FOREIGN PATENT DOCUMENTS

| | | | |
|---|---|---|---|
| WO | WO-2006108269 | A1 | 10/2006 |
| WO | WO-2007021920 | A2 | 2/2007 |

OTHER PUBLICATIONS http/www.esko.com/tmp/080606115325/G2558322_Kongsberg_tables_us_pdf.

* cited by examiner

DYNAMIC BLEED AREA DEFINITION FOR PRINTING OF MULTI-DIMENSIONAL SUBSTRATES

BACKGROUND

Bleeding of images is a well-known aspect of printing. In general, "bleed" refers to a portion of an image that extends beyond a desired print area border, such as the edge of a page, a corner of a package face, or a boundary within a portion of a printed substrate. Bleed parameters are commonly established during the design of a print template. For example, when printing a two-dimensional document such as a postcard, no bleed may be required if the postcard will include an image surrounded by a white (i.e., unprinted) border. However, if it is desired that the image will extend to the border of the postcard, then the print template may include a bleed area—in this case, an area on which an extra portion of the image is printed. The bleed area allows for minor registration errors that may result from mechanical limitations of the printing and cutting equipment, minor sheet misalignment, or operator error. The bleed area may be trimmed before the card is considered to be final and ready for use When printing a two dimensional substrate that will be cut and folded into a three-dimensional package, the template may need to include multiple bleed areas for multiple facets of the package. Until now, the defined bleed areas have been static, and directly associated with the template. However, such pre-defined templates are not useful in the context of personalized packaging for small volume runs. In personalized packaging, the print system must apply a dynamic rule set for many varied package runs, some of which may have a run length of only one package. Thus, the current options for generating bleed definitions for package printing are not useful in this context of personalized or small-run package printing.

This document describes systems and methods that present solutions to the problems discussed above, and which may also provide additional benefits.

SUMMARY

In an embodiment, a system implements a method of defining a three-dimensional structure having multiple facets, such as a package. Using a processor, the system receives a two-dimensional representation of the three-dimensional structure, identifies an image that is to be printed on a first facet, identifies a second facet of the structure that has a functional relationship with the first facet, determines whether the functional relationship is that of a crease, an edge, or another functional relationship, and automatically defines a bleed area by accessing a rule set and applying the rule set to the determined functional relationship. The bleed area includes an area in which the first image will be printed and that is outside of the location of the first facet. The system saves, to a computer-readable memory, a printing template that includes the defined bleed area.

Optionally, the system may also identify additional facets having one or more images that are to be printed thereon. For each additional identified facet, the system may determine whether the identified facet has a functional relationship with another facet. If so, the system may automatically define a bleed area for the identified facet based on its functional relationship. The system may save each of the bleed areas defined for each additional identified facet to the printing template.

In some embodiments, the system may include a user interface through which a modified two-dimensional representation is received. The modified two-dimensional representation modifies the functional relationships for at least one pair of the facets. In this embodiment, the system may automatically generate a revised bleed area for at least one of the facets based on the modified functional relationships, and it may save each of the revised bleed areas to the printing template.

Optionally, the system may include a package generating device, such as one having a printing device, a cutting device and a creasing device, along with elements such as a processor. The system may use the printing template to generate a three-dimensional package flat by: (1) printing the image on locations of the substrate that correspond to the first facet and the bleed area; (2) applying a cut line to each location of the substrate that corresponds to an edge in the template; and (3) applying a crease line to each location of the substrate that corresponds to a crease in the template.

Optionally, the system may determine that functional relationship comprises an edge. If so, it may define the bleed area as an area in which a portion of the image will be blended with a portion of a second image that is to be printed on the second facet. Alternatively, it may define the bleed area as an area in which a portion of the image will extend into a substrate portion that will be cut away and not included in the three-dimensional structure.

Optionally, if the functional relationship comprises a partial cut, the system may define the bleed area as an area that extends along the crease at a width that is at least as large as that of the crease, and it may require that the image be printed in the bleed area so that it fades as it moves into the bleed area and reaches a zero point at or before the location of the partial cut. If the functional relationship comprises a perforation, the system may define the bleed area as an area that extends along the crease at a width that is at least as large as that of the crease, and it may require that the image be printed in the bleed area so that it fades as it moves into the bleed area and reaches a zero point after the location of the perforation. If the functional relationship comprises a flap and a cut-away section, the system may define the bleed area as an area of the flap, and it may require that the image be printed in the bleed area so that it is positioned to appear through the cut-away section when the three structure is folded into a three-dimensional form.

Any or all of the items listed above may be implemented by a package definition system that includes a data storage facility, a processor, and computer-readable medium containing programming instructions that, when executed, instruct the processor to perform various functions. Optionally, the system also may include a user interface and/or a package generation device.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

As used in this document, the term "multi-functional device" refers to a machine or group of machines comprising hardware and associated software for printing, copying, facsimile transmitting or receiving, scanning, or performing other actions on document-based data. A "print device" is a device that performs printing based on digital data, or a multi-functional device in which one of the functions is printing based on digital data. A "package generation device" is a machine or group of machines that combines the features of a print device with one or more tools for imparting a cut, crease, and/or perforation on a printed substrate so that the substrate may be folded into a three-dimensional package.

Package production may be performed by a package generation system that is capable of performing printing operations on, and applying creases and cuts to, a substrate. The system also may perform other actions such as coating and/or stacking the substrate. Examples of automated package production system include those in the iGen™ series of digital production printing presses, available from Xerox Corporation, in connection with the corresponding finishing devices. Other systems may include smaller printing devices, such as a Xerox DocuColor 250, or a digital cutter as offered by a variety of manufacturers. In some embodiments, the substrate may be thicker than ordinary paper. For example, it may be cardboard, cardstock, or another material that will provide a self-supporting three-dimensional structure when folded into a package.

One aspect in the creation of the packages is that the printing device operates on a two dimensional sheet or "flat." The actual three-dimensional shape of the package is subsequently created through folding and connecting of the facets that make up the flat. This imposes a variety of restrictions on the structures both in its two dimensional form, as well as in its three dimensional form.

Figure 1:
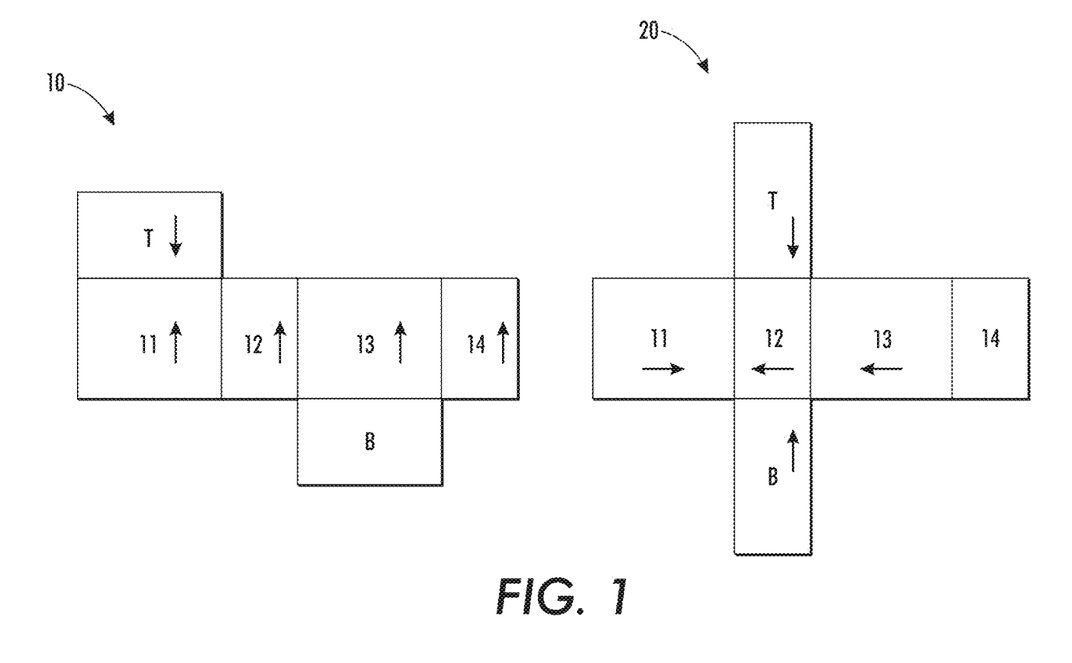
FIG. 1 depicts an example of faces that may make up a two-dimensional package flat.

FIG. 1 shows two different layouts of package flats that may appear to be identical when formed into a three-dimensional package. In the first embodiment 10, in this case a rectangular box, a variety of faces 11-14 are shown. A top face T and a bottom face B are also shown, with top face T being connected to side 11 by a fold, and bottom face being connected to side 13 by another fold. In the second embodiment 20, the same faces 11-14 are shown. However, the other two faces are in different locations. Specifically one lid T is connected to side 12 by a fold, and a second lid B is connected to side 13 by another fold. Thus, as shown boxes 10 and 20 may appear to be indistinguishable when folded, but the two-dimensional layouts show that the two embodiments have different top and bottom lid structures. In use, box 10 may be printed so that face 13 is the primary face showing a logo or address label, with top face T functioning as a lid. Box 20 also may use printed face 13 is the primary face, but face 12 may be the actual top, and lids T and B may be positioned on the left and right sides of the package and serve as openings.

To form a three-dimensional package, the two-dimensional flats of FIG. 1 would include additional elements, referred to in this document as functional elements, that serve to join two or more faces. A functional element may be a fold as shown, or it may be a lid, lip, tab, flap, receptacle, or other structure that either extends into or is received by a face or another functional element. In this document the term "facet" may be used to refer to either a face or a functional element.

The required bleed definitions of box 10 and 20 would be different, as the two embodiments would require different combinations of functional elements to form a three-dimensional package. For example, in box 10 faces 11 and T touch, and thus no whitespace (i.e., unused substrate area) exists between the faces. However, when the document is printed on a substrate and before the edges are cut, whitespace (i.e., a substrate area that does not form part of the three-dimensional package) may exist between sides 12 and T. In contrast, in box 20 faces 12 and T touch and thus have no whitespace between them, while whitespace would exist between sides 11 and T on the substrate prior to cutting.

In the present embodiments, a template for printing the package may be defined. Any suitable template generation process may be used to define content to be printed, cuts, creases, and the locations and sizes of each of these elements. How the system treats bleed areas may vary based on the functional interaction of the facets on which the image and bleed area will overlap. This may include defining a whitespace bleed area for adjoining edges, crease bleed for facets that are joined by a crease, and other bleed areas for facet pairs that have other functional relationships.

Whitespace Bleed Areas:

In the present method and system, the template may include a whitespace bleed area for some or all facet edges or edge portions that are not joined to another facet in the two-dimensional package flat. A whitespace bleed area is an area of a two-dimensional substrate that has a defined size and location and which is adjacent to an edge of a facet. The whitespace area may have a portion of an image printed thereon in the two-dimensional flat, but the whitespace area will be cut away before the package is formed into a three-dimensional product.

Figure 2:
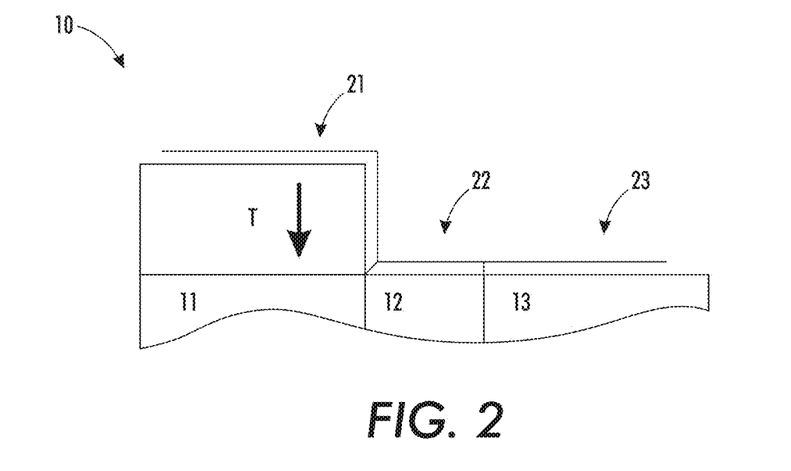
FIG. 2 depicts an example of a whitespace bleed area for a package flat.

As an example of a whitespace bleed definition, FIG. 2 shows that in the context of a template for package 10, the system may define whitespace bleed areas 21, 22 and 23 for each face having an edge. The size of each whitespace area may be pre-defined (i.e., it may extend from the facet at a set fraction of an inch, or a number of millimeters or other unit of measure away from the edge), or it may be dynamically defined as a function of one or more dimensions of the facet, the edge, or the package. For example, a whitespace area may be defined to extend a distance away from each edge, where the distance equals a percentage of the overall height or width of the package. For whitespace areas that are adjacent to corner elements, the whitespace may be inclined so that a border of the bleed area extends away from the edge at an angle of 45 degrees, or some other angle that is normally not perpendicular to the edge of the facet and which extends toward the other face that forms the corner. As an example, in FIG. 2 faces T and 12 form a corner, and the bleed area 21 extends from face T at an angle towards face 12.

Figure 3:
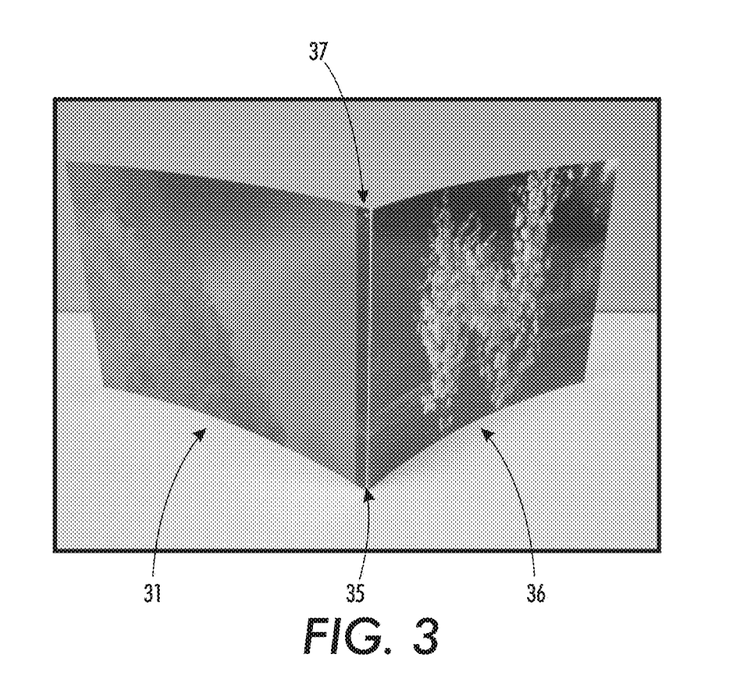
FIG. 3 illustrates an example of misalignment in a package having a crease.

Crease Bleed Areas:

A crease may be formed on a substrate by imparting a line of compression or ablated area without fully cutting through or destroying the substrate's fiber. This may be done by compressing the substrate with a roller or other blunt instrument, partially cutting the substrate with a knife under low pressure (sometimes referred to as a "kiss cut"), by applying a perforation to the substrate, or by other processes. FIG. 3 illustrates an example of a three-dimensional structure to which a kiss cut has been applied. The structure has a first face 31 and a second face 32 that are joined by a crease 35. As shown, the crease has been formed by a "kiss cut" in which fibers have been cut, so that the color of the substrate (e.g., white) may appear through the crease 35. As shown, the image that is printed on the second face 32 bleeds over to the first face 31 in a bleed area 37. This may occur due to substrate misalignment in the printing device, and is especially noticeable in an example such as this where the image that bleeds has a different color or brightness than that of the face onto which the image bleeds. Note that the example of FIG. 3 intentionally shows a misalignment for the purpose of illustration.

Figure 4:
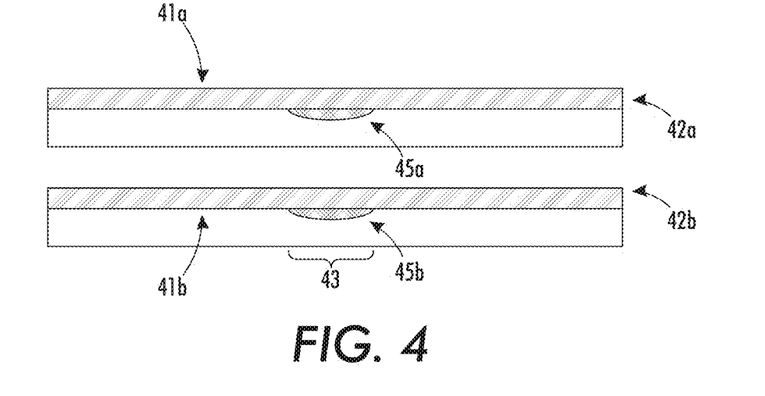
FIG. 4 illustrates an example of two faces of a package having a compression crease, with a bleed area over the compression crease.

If the crease has been formed with a compression tool such as a roller, the system may define a bleed area for the compression crease in a manner similar to that described above for the whitespace bleed area. In FIG. 4, the upper embodiment shows a substrate on which two images 41a and 42a are printed side-by-side on a substrate so that the images border each other over the compression crease 45a. In this example, the printing of each image occurred perfectly and no bleed occurred. However, to allow for mis-registration or other errors, the lower embodiment shows an example where the system has defined a bleed area 43 on which a portion of both images 41b and 42b are printed in overlapping fashion. The bleed area 43 may have a width and/or a length that is at least as large as the corresponding width and/or length of the compression crease 45b. In some embodiments, the dimension of the bleed area may be dynamically defined as a function of the corresponding dimension of the compression crease, such as being equal to the crease's dimension as modified by a multiplier, or by an additional predetermined amount. When printing the image from the template with the defined bleed area, a print device may print the images 41b and 42b so that a portion of each image appears on the bleed area 43. In some embodiments, the template may define the printing procedure so that each image is faded, i.e., printed with less ink, as the distance increases away from the image's primary face and into the bleed area. The fade may be a linear function of distance. FIG. 4 illustrates this by showing that a linear decrease in the amount of toner may be used to print each image as the distance away from the image's primary face is increased.

Figure 5:
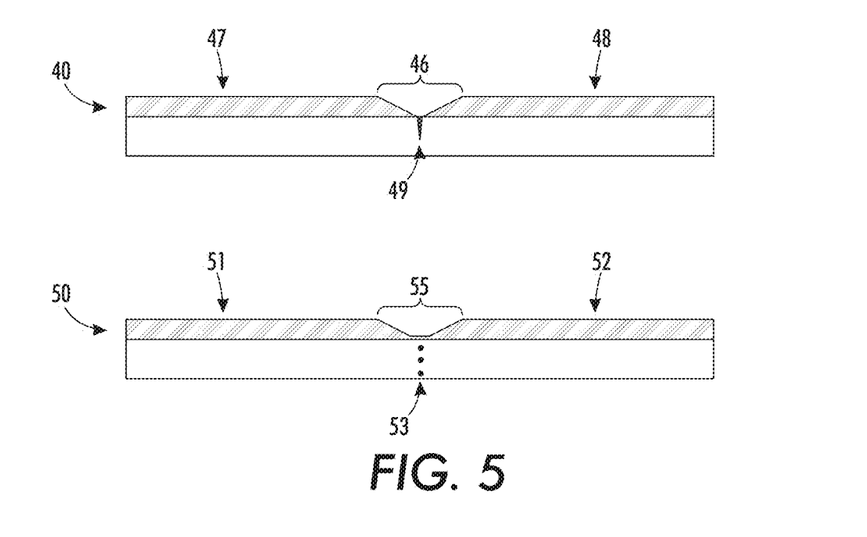
FIG. 5 illustrates how bleed areas may be defined over a crease that is formed by a kiss cut and a perforation cut.

FIG. 5 illustrates an example of how the system may define a bleed area if the crease has been formed by a kiss cut or perforation cut. In the first embodiment 40, a substrate includes a crease 49 formed by a kiss cut that exposes a portion of the substrate's interior, such as fiber in the case of a paper substrate. The bleed area 46 is defined to be positioned along the crease 49 with a width and/or a length that is at least as large as the corresponding width and/or length of the kiss cut crease 49 in a manner similar to that described above for a compression crease. However, instead of overlapping in the crease area, the template requires that the images 47, 48 be printed so that they fade as they move toward the crease (i.e., the interior of the bleed area 46). Optionally, the images may fade to a color that is a metameric match to the color of the interior of the substrate (e.g., white), or they may be blended with a color that metamerically matches the exposed interior so that the match color becomes more prominent as distance away from the edges and toward the center of the bleed area 46 is increased. In this way, the fading to a color that is a metameric match with that of the substrate interior may help hide interior fiber or other material that may be exposed by the kiss cut.

In the second embodiment 50 of FIG. 5, the substrate includes a perforation cut 53 to form the crease. The bleed area 55 is defined to be positioned along the crease with a width and/or a length that is at least as large as the corresponding width and/or length of the perforation cut crease 53 in a manner similar to that described above for a compression crease and a kiss cut crease. The template may requires that the images 51, 53 be printed so that they fade as they move toward the interior of the bleed area 55. Optionally, the images may fade to and approach a central area within the bleed area where the two images are blended. Thus, a lighter version of the overlapping images may appear in the bleed area 55.

Figure 6:
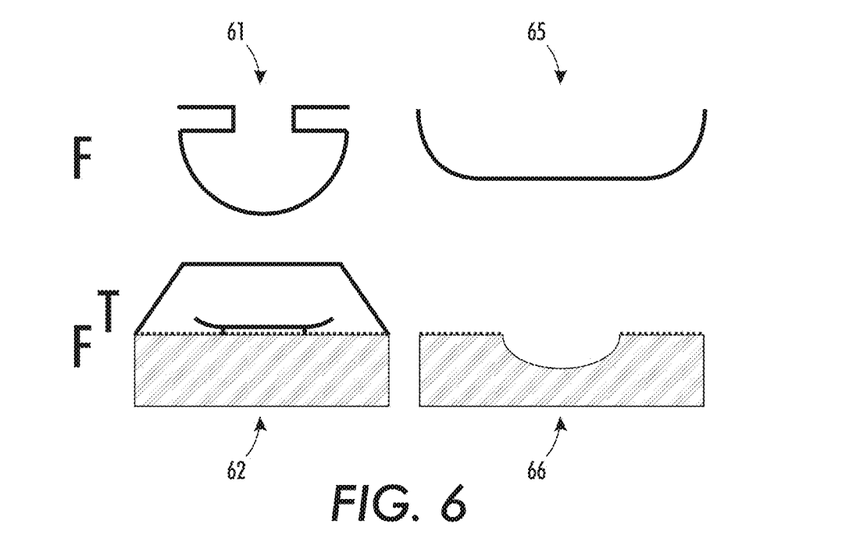
FIG. 6 illustrates two examples of functional element pairs for a package.

Other Functional Interrelationships:

As noted above, in addition to faces, the facets of a package may include functional elements that provide a connecting or other structural function for the various elements of the package. Functional elements may include folds, lids, lips, tabs, flaps, receptacles, or other structures that either extend into or are received by a face or a corresponding functional element. Two examples are shown in FIG. 6, where a first functional element F and its corresponding transposed functional element $F^T$ are shown. In the example shown on the left side of the figure, a locking tab 61 is shown with a corresponding slot 63 to receive the tab. In this embodiment, when the package is closed the tab 61 will be positioned completely inside the package. Thus, any suitable bleeding procedure may be used to define a bleed area across the tab 61, such as the whitespace bleeding technique described above.

The functional element shown on the right in FIG. 6 is a flap 65 of a lid, and the corresponding element is a face 66 having a cut-out area to facilitate opening of the lid. Because a portion of the flap 65 will be visible on the exterior of the package through the cut-out area of face 66, and because of the functional interrelationship of flap 65 and face 66, a bleed area for face 66 will be defined to include at least a portion of lip 66, including the portion of flap 65 that will appear through the cut-out area.

Thus, the system may include computer programming with a rule set that dynamically defines each bleed area as the template for the package is constructed. The system may walk through the template and define a bleed area for each edge, crease, and other functional interrelationship that exists between pairs of facets. The system may not necessarily define a bleed area for each facet, but in some embodiments it may define a bleed area for each facet on which an image will be printed to the facet's edge. The bleed areas may dynamically and automatically be redefined as a user makes changes to a package design using a package definition system.

In an embodiment, a system may include a user interface that displays a three-dimensional and/or two-dimensional representation of a package. As a user alters various features of the package, for example by switching from package design 10 to package design 20, the system may implement programming instructions that dynamically redefine the bleed areas to match the new design.

Figure 7:
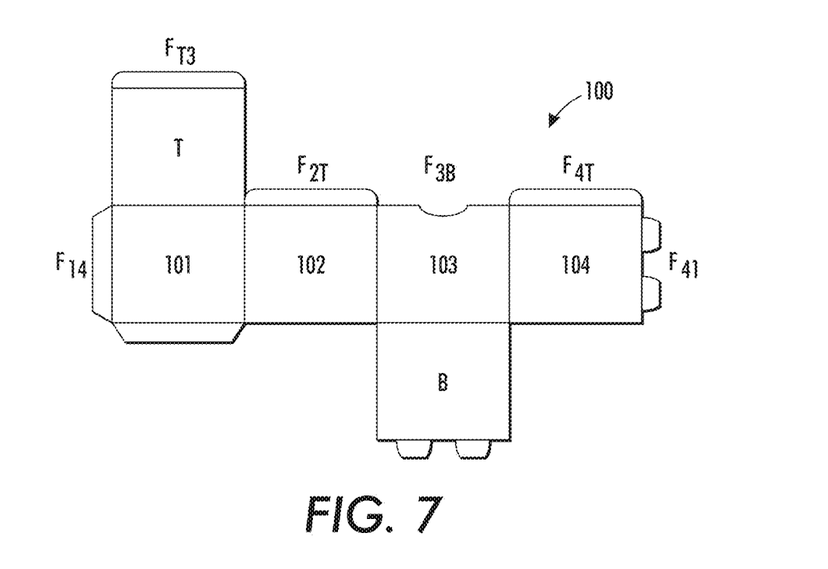
FIG. 7 illustrates an example of a package flat with various faces and functional elements.

FIG. 7 illustrates an example of a two-dimensional package 100 for which a template may be generated. As shown, the package 100 includes side faces 101-104, a top face T, and a bottom face B. The package also includes various functional elements including flaps $F_{14}$, $F_{T3}$, $F_{2T}$ and $F_{4T}$; tabs $F_{41}$ and a cut-out area $F_{3B}$ in side face 103. The following bleed areas may be defined based on the functional interrelationship of various face pairs:

Crease bleeds that include sections of adjoining faces: 101-T, 101-102, 102-103, 103-104, 103-B;

Whitespace bleeds include: 101-W, 101-S 102-S, 103-N, 104-N, 104-E, and B-ESW (Here, N-E-S-W represent virtual compass positions, with north being toward the top of the page in FIG. 4. Thus, the whitespace bleed area "102-S" will include a portion of face 102 and a portion of the substrate just "south" of face 102 that will be cut away before the package is folded);

Crease bleeds that include sections of a face and an adjoining functional element: T-$F_{T3}$; and Functional bleed using a portion of the image from surface 103: $F_{T3}$.

Note that not all elements that are functionally related necessarily need to include a defined bleed area. For example, a bleed area for adjoining facets 104 and $F_{41}$ may or may not be defined, since facet $F_{14}$ will be positioned on the interior of the package and thus not important to the box's exterior appearance when the package is folded into its three-dimensional form.

Figure 8:
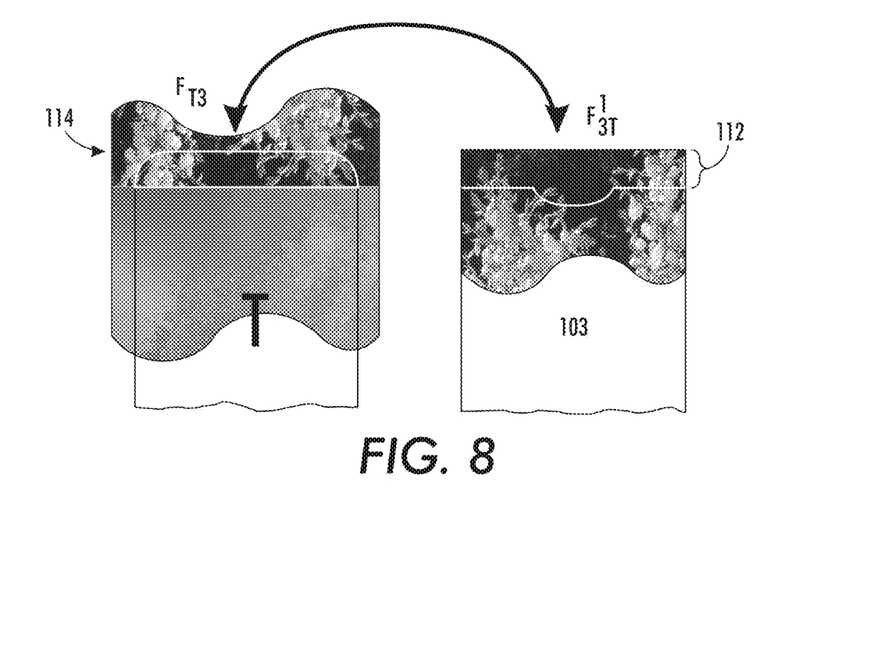
FIG. 8 illustrates an example of how printing may be applied to a bleed area of a portion of the package flat of FIG. 7.

FIG. 8 illustrates an example of how the template may instruct that the bleed area T-$F_{T3}$ listed above be printed on a substrate. As shown, the image to be printed on face 103 may need to bleed in two locations: (1) a white space bleed in a bleed area 112 above (i.e., north of) face 103 as indicated in the list above; and (2) as a functional bleed area 114 on at least a portion of functional element $F_{T3}$. Thus, a common portion of the image will be printed in both bleed areas 112 and 114. Note that the portion of the image printed in bleed area 114 is rotated 180° so that its orientation is correct when the lip $F_{T3}$ is inserted behind the cut-out area of side 103.

Figure 9:
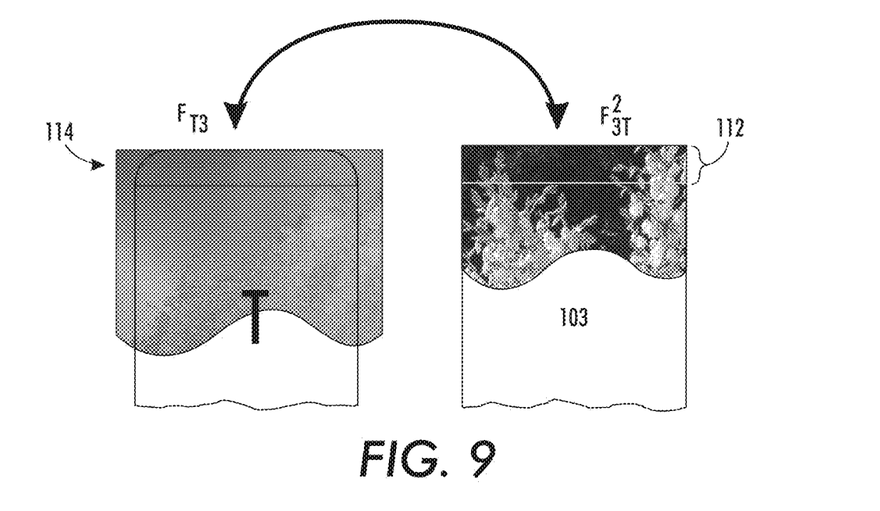
FIG. 9 illustrates the example of FIG. 8 may change if the structure or function of one of the facets is changed.

FIG. 9 illustrates an example of how the system may dynamically respond to a change to the function or structure of a facet. As with FIG. 8, the template of FIG. 9 includes an image to be printed on face 103. However, functional element $F_{3T}$ no longer includes a cut-out, so lip $F_{T3}$ will not be visible through functional element $F_{3T}$. Thus, a functional bleed area 114 is no longer required on lip $F_{T3}$.

Figure 10:
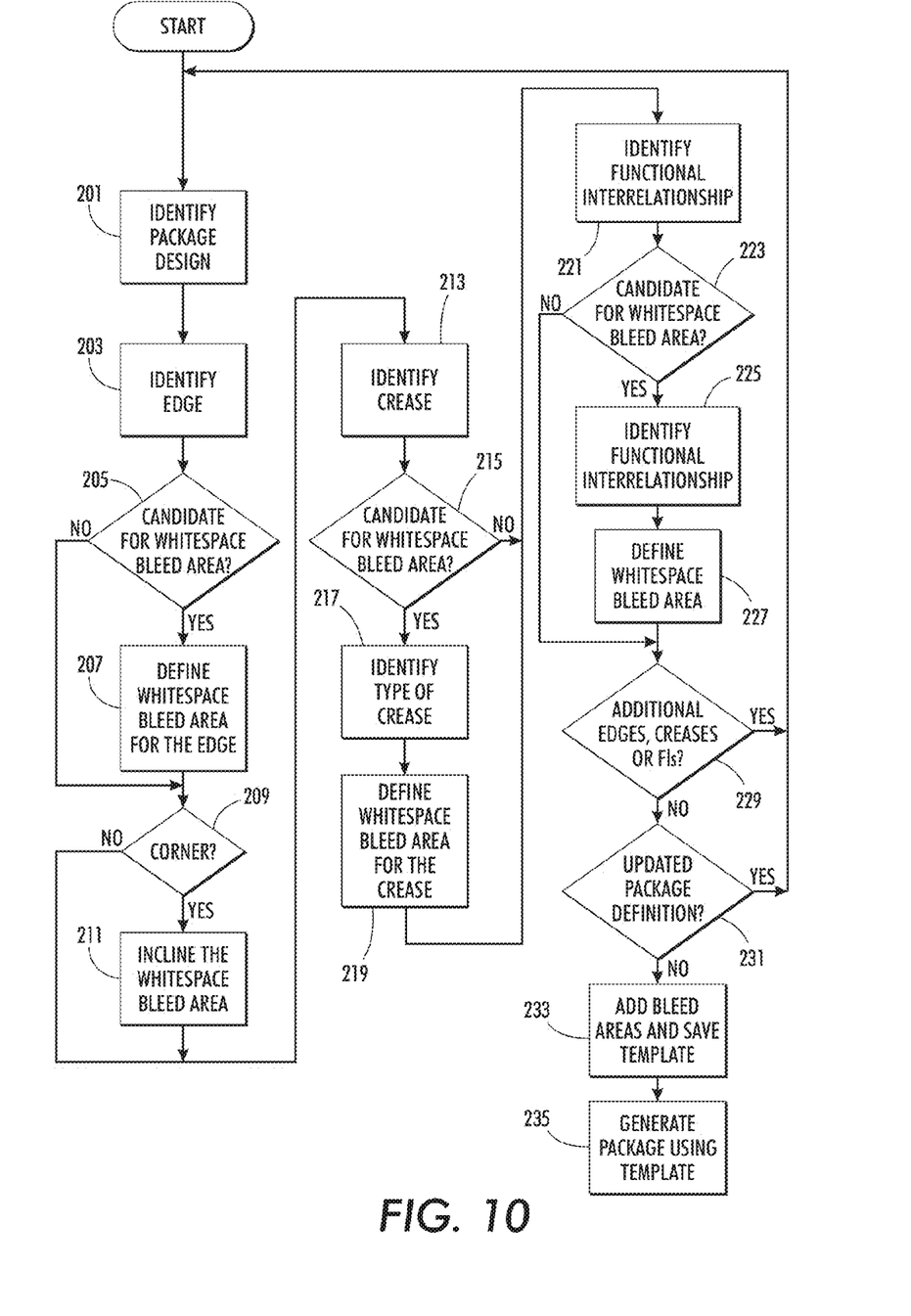
FIG. 10 is a flowchart describing various elements of a process of generating a package definition template having defined bleed areas.

FIG. 10 illustrates a process by which the system may generate a package template including bleed areas as the user selects the structural elements of the package. The system may include a user interface, such as a touch-screen display, keyboard, mouse, and/or other equipment that accepts user input and generates or receives a structural representation of the three-dimensional package. After the system identifies a package design 201 based on user selection or based on structural parameters identified by the user, the system may walk through the package to identify any first facet having an image that will be printed thereon, and a second facet that has a functional relationship with the first facet. A pair of facets has a functional relationship if they are directly connected while the package remains as a two-dimensional flat, or if the facets will be have an adjoining structure when the package is in its three-dimensional form. Functional relationships may exist for facet pairs that form edges, creases, and other adjoining structural features.

When the system identifies an edge 203, it may determine whether the edge is a candidate for a whitespace bleed area 205. It may apply any suitable rule for this determination. For example, if the edge's face has an image that does not extend to the edge, it may not be a candidate for a whitespace bleed area; otherwise, it may be a candidate. If the edge is a candidate for a whitespace bleed area, the system may define a whitespace bleed area for the edge 207. The system may also determine whether the edge forms part of a corner of the package structure 209, and if so it may define the whitespace bleed area so that it is inclined with respect to its face 211 as described above.

When the system identifies a crease 213, it may determine whether the crease is a candidate for a whitespace bleed area 215. It may apply any suitable rule for this determination. For example, if the crease joins two facets, if each of the facets includes at least a portion that is externally-facing when the package is folded into its three-dimensional form, then the crease may be a candidate for a whitespace bleed area. If the edge is a candidate for a whitespace bleed area, the system may determine the type of crease 217 (e.g., compression, kiss cut, or perforation cut) and define a whitespace bleed area for the edge that, per the rule set, is appropriate for the type 219.

When the system identifies two facets having another type of functional relationship 221, such as a flap that will be positioned behind a cut-away portion of a face, it may determine whether the element pair is a candidate for a whitespace bleed area 223. It may apply any suitable rule for this determination. For example, if both facets include at least a portion that is externally-facing when the package is folded into its three-dimensional form, then the flap may be a candidate for a whitespace bleed area. If the flap is a candidate for a whitespace bleed area, the system may determine the type of functional relationship 225 and define a whitespace bleed area for the edge that is appropriate for the type of functional relationship 227, an example of which is shown in FIG. 8.

Returning to FIG. 9, the system may determine whether additional edges, creases, or functional interrelationships exist in package that have not yet been analyzed 229, and if so it may repeat any or all of the steps listed above for such elements. Similarly, if a user input results in a redesign of the package 231, the system may re-start the process and automatically, without requirement for any user input, determine new bleed areas for the redesigned package. Once the system has analyzed all elements and no further changes are received, the system may save the bleed areas to the package template 233 and ultimately use the package template to generate the package 235.

Figure 11:
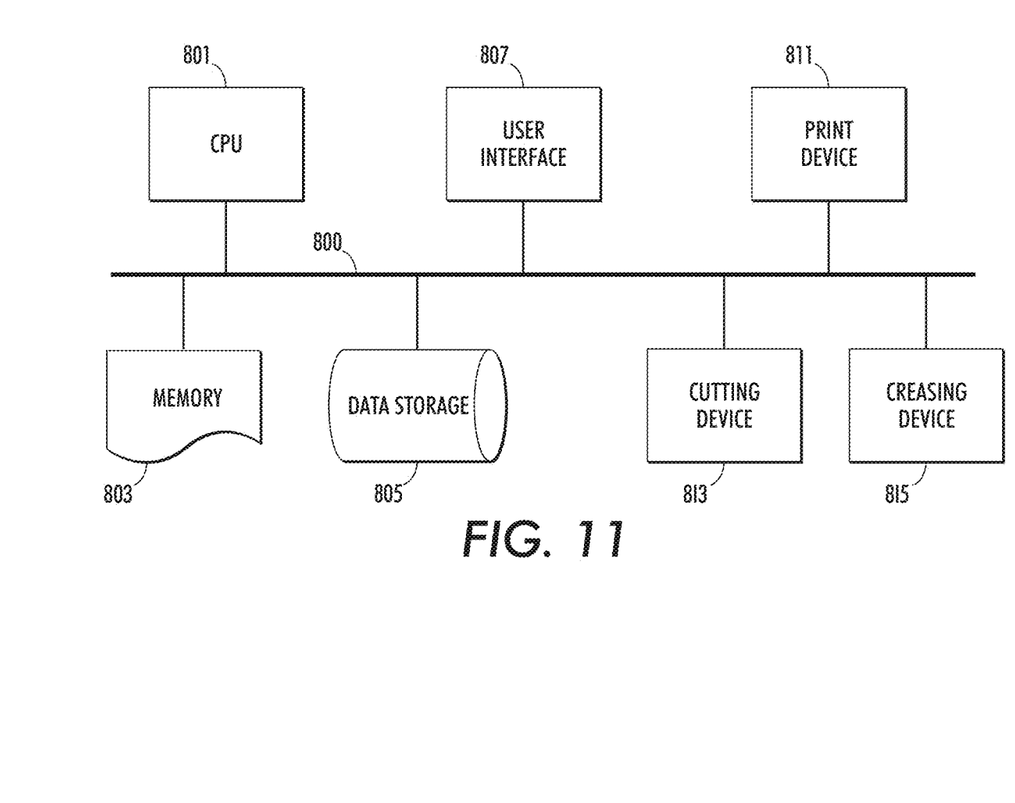
FIG. 11 is a block diagram showing various equipment that may be used to implement various embodiments of the processes described in this document.

FIG. 11 depicts a block diagram of hardware and/or electronics that may make up a package definition and/or production system. One or more communications lines 800 such as a bus or network interconnect the illustrated components and allow data and/or signals to flow between the components. Central processing unit (CPU) 805 is a processor that performs calculations and logic operations required to execute a program. Any number of processors may be available, and they may access a tangible, computer-readable memory device 803 containing programming instructions, along with a data storage facility 805 such as a database that stores the package generation templates and/or rule sets.

A user interface 807 provides output to, and receives input from, a user. The user interface may include a display, audio output, a printer, or another element that provides information to a user. The user interface 807 also may include a touch-sensitive component, microphone, audio port, keyboard, mouse, touch pad, or other input mechanism that is capable of receiving user input.

The system also may include a package generation device, which may include some or all of the following elements: a print device 811, a knife or other cutting device 813, and a roller or other device 815 capable of imparting a crease in a substrate.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising, by a processor:
   receiving a two-dimensional representation of a three-dimensional package, the representation comprising a plurality of facets;
   identifying an image that is to be printed on a first facet of the package;
   identifying a second facet of the package that has a functional relationship with the first facet;
   determining whether the functional relationship is that of a crease, an edge, or another functional relationship;
   automatically defining a bleed area corresponding to the functional relationship by accessing a rule set and applying the rule set to the determined functional relationship, so that the bleed area comprises an area in which the first image will be printed and that is outside of the location of the first facet, wherein the rule set comprises a plurality of rules for defining plurality of bleed areas based on a plurality of functional relationships; and
   saving, to a computer-readable memory, a package printing template that includes the defined bleed area.

2. The method of claim 1, further comprising:
   identifying a plurality of additional facets having one or more images that are to be printed thereon;
   for each additional identified facet, determining whether the identified facet has a functional relationship with another facet, and if so automatically defining a bleed area for the identified facet based on its functional relationship; and
   saving each of the bleed areas defined for each additional identified facet to the package printing template.

3. The method of claim 2, further comprising:
   receiving, via a user interface, a modified two-dimensional package representation, wherein the modified two-dimensional package representation modifies the functional relationships for at least one pair of the facets;
   automatically generating a revised bleed area for at least one of the facets based on the modified functional relationships; and
   saving each of the revised bleed areas to the package printing template.

4. The method of claim 1, further comprising:
   by a package generating device, using the package printing template to generate a three-dimensional package flat by:
   printing the image on locations of the substrate that correspond to the first facet and the bleed area;
   applying a cut line to each location of the substrate that corresponds to an edge in the template; and
   applying a crease line to each location of the substrate that corresponds to a crease in the template.

5. The method of claim 1, further comprising:
   determining that the functional relationship comprises a compression crease;
   defining the bleed area as an area that extends along the crease at a width that is at least as large as that of the crease; and
   requiring that the image be printed in the bleed area so that a portion of the image will be blended with a portion of a second image that is to be printed on the second facet.

6. The method of claim 1, further comprising:
   determining that the functional relationship comprises an edge; and
   defining the bleed area as an area in which a portion of the image will extend into a substrate portion that will be cut away and not included in the package.

7. The method of claim 1, further comprising:
   determining that the functional relationship comprises a compression crease;
   defining the bleed area as an area that extends along the crease at a width that is at least as large as that of the crease; and
   requiring that the image be printed in the bleed area so that it fades as a linear function of distance as it moves into the bleed area and away from the first facet.

8. The method of claim 1, further comprising:
   determining that the functional relationship comprises a partial cut or a perforation;
   defining the bleed area as an area that extends along the crease at a width that is at least as large as that of the crease; and
   requiring that the image be printed in the bleed area so that it fades as a linear function of distance as it moves into the bleed area and reaches a zero point at or before the location of the partial cut.

9. The method of claim 1, further comprising:
   determining that the functional relationship comprises a partial cut or a perforation;
   defining the bleed area as an area that extends along the crease at a width that is at least as large as that of the crease; and
   requiring that the image be printed in the bleed area so that it fades as a linear function of distance to a first color that is a metameric match of a color of an interior of a substrate of the three-dimensional package, as it moves into the bleed area and reaches a zero point after the location of the perforation.

10. The method of claim 1, further comprising:
    determining that the functional relationship comprises a flap and a cut-away section;
    defining the bleed area as an area of the flap; and
    requiring that the image be printed in the bleed area so that it is positioned to appear through the cut-away section when the package is folded into a three-dimensional form.

11. A system for defining a three-dimensional structure, comprising:
    a processor; and
    a memory containing programming instructions that, when executed, are configured to instruct the processor to:
    receive a two-dimensional representation of a three-dimensional structure, wherein the representation comprises a plurality of facets,
    identify an image that is to be printed on a first facet of the structure,
    identify a second facet of the structure that has a functional relationship with the first facet,
    determine whether the functional relationship is that of a crease, an edge, or another functional relationship,
    automatically define a bleed area corresponding to the functional relationship by accessing a rule set and apply the rule set to the determined functional relationship, so that the bleed area comprises an area in which the first image will be printed and that is outside of the location of the first facet, wherein the rule set comprises a plurality of rules for defining a plurality of bleed areas based on a plurality of functional relationships, and save, to a computer-readable memory, a three dimensional structure printing template that includes the defined bleed area.

12. The system of claim 11, further comprising additional programming instructions that, when executed, are configured to instruct the processor to:

identify a plurality of additional facets having one or more images that are to be printed thereon;

for each additional identified facet, determine whether the identified facet has a functional relationship with another facet, and if so automatically define a bleed area for the identified facet based on its functional relationship; and save each of the bleed areas defined for each additional identified facet to the printing template.

13. The system of claim 12, further comprising:
a user interface; and
additional programming instructions that, when executed, are configured to instruct the processor to:
 receive, via the user interface, a modified two-dimensional representation, wherein the modified two-dimensional representation modifies the functional relationships for at least one pair of the facets,
 automatically generate a revised bleed area for at least one of the facets based on the modified functional relationships, and
 save each of the revised bleed areas to the printing template.

14. The system of claim 11, further comprising:
a package generating device comprising a printing device, a cutting device, a creasing device and a processor; and
additional programming instructions that, when executed, are configured to cause the package generating device processor to generate a three-dimensional package flat by:
 using the printing device to print the image on locations of the substrate that correspond to the first facet and the bleed area,
 using the cutting device to apply a cut line to each location of the substrate that corresponds to an edge in the template, and
 using the creasing device to apply a crease line to each location of the substrate that corresponds to a crease in the template.

15. The system of claim 11, further comprising additional programming instructions that, when executed, are configured to instruct the processor to:
determine that the functional relationship comprises a compression crease;
define the bleed area as an area that extends along the crease at a width that is at least as large as that of the crease; and
require that the image be printed in the a portion of the image will be blended with a portion of a second image that is to be printed on the second facet.

16. The system of claim 11, further comprising additional programming instructions that, when executed, are configured to instruct the processor to:
determine that the functional relationship comprises an edge; and define the bleed area as an area in which a portion of the image will extend into a substrate portion that will be cut away and not included in the package.

17. The system of claim 11, further comprising additional programming instructions that, when executed, are configured to instruct the processor to:
determine that the functional relationship comprises a compression crease;
define the bleed area as an area that extends along the crease at a width that is at least as large as that of the crease; and
require that the image be printed in the bleed area so that it fades as a linear function of distance as it moves into the bleed area and away from the first facet.

18. The system of claim 11, further comprising additional programming instructions that, when executed, are configured to instruct the processor to:
determine that the functional relationship comprises a partial cut or a perforation;
define the bleed area as an area that extends along the crease at a width that is at least as large as that of the crease; and
require that the image be printed in the bleed area so that it fades as a linear function of distance as it moves into the bleed area and reaches a zero point at or before the location of the partial cut.

19. The system of claim 11, further comprising additional programming instructions that, when executed, are configured to instruct the processor to:
determine that the functional relationship comprises a partial cut or a perforation;
define the bleed area as an area that extends along the crease at a width that is at least as large as that of the crease; and
require that the image be printed in the bleed area so that it fades as a linear function of distance to a first color that is a metameric match of a color of an interior of a substrate of the three-dimensional package, as it moves into the bleed area and reaches a zero point after the location of the perforation.

20. The system of claim 11, further comprising additional programming instructions that, when executed, are configured to instruct the processor to:
determine that the functional relationship comprises a flap and a cut-away section;
define the bleed area as an area of the flap; and
require that the image be printed in the bleed area so that it is positioned to appear through the cut-away section when the package is folded into a three-dimensional form.

21. A method of generating a template for a three-dimensional structure comprising, by a processor:
receiving a two-dimensional representation of a three-dimensional structure, the representation comprising a plurality of facets;
identifying an image that is to be printed on a first facet of the structure;
identifying a second facet of the structure that has a functional relationship with the first facet;
determining whether the functional relationship is that of a crease, an edge, or another functional relationship;
automatically defining a bleed area corresponding to the functional relationship by accessing a rule set that includes a plurality of the following rules for defining a plurality of bleed area based on a plurality of functional relationships:

if the functional relationship comprises a partial cut, defining the bleed area as an area that extends along the crease at a width that is at least as large as that of the crease, and requiring that the image be printed in the bleed area so that it fades as a linear function of distance as it moves into the bleed area and reaches a zero point at or before the location of the partial cut, if the functional relationship comprises a perforation, defining the bleed area as an area that extends along the crease at a width that is at least as large as that of the crease, and requiring that the image be printed in the bleed area so that it fades as a linear function of distance as it moves into the bleed area and reaches a zero point after the location of the perforation, and if the functional relationship comprises a flap and a cut-away section, defining the bleed area as an area of the flap, and requiring that the image be printed in the bleed area so that it is positioned to appear through the cut-away section when the package is folded into a three-dimensional form, and saving, to a computer-readable memory, a printing template that includes the defined bleed area.

\* \* \* \* \*